Figure 1:
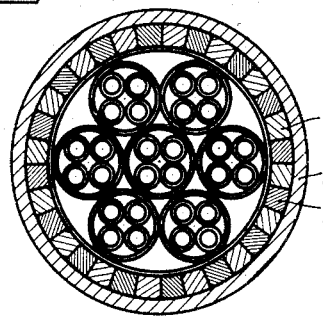

July 14, 1931.    F. HANFF    1,814,384

LEAD COVERED SUBMARINE CABLE

Filed April 29, 1929

Inventor
Ferdinand Hanff
by Knight Bros
Attorneys

Patented July 14, 1931

1,814,384

UNITED STATES PATENT OFFICE

FERDINAND HANFF, OF BERLIN-CHARLOTTENBURG, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

LEAD-COVERED SUBMARINE CABLE

Application filed April 29, 1929, Serial No. 358,914, and in Germany May 1, 1928.

My invention relates to improvements in lead-covered submarine cables.

Submarine cables are provided with a supporting member between the core of the cable and the lead cover or sheath against which the inner wall of the lead cover rests as a protection against the pressure exerted upon the cable by the water. The known supporting members consist of a wire helix of round or polygonal wire or of a sheath of cabled or twisted wires. It has also been proposed to use a metal hose pipe of overlapping section wires or bands.

At very great depths, say 2000 m. and beyond, it is impossible to prevent in the above constructions the water pressure from forcing the lead cover or sheath into or through the unavoidable joints or interstices of the supporting structure, whereby the cable core may become injured or the electric values of the cable conductors be impaired.

According to my invention this drawback is eliminated by combining alternate wires of higher and lower compressive strength into a tube, shell or sheath which surrounds the cable core. As suitable materials for the wires of higher compressive strength steel, bronze or a hard aluminium alloy may for instance be used, as material of lower compressive strength, for instance zinc, copper, aluminum, lead or the like. As the wires of lower compressive strength are stressed beyond the elastic limit by the total pressure acting from outside upon the supporting member and are thus tightly pressed against the wires of higher compressive strength the supporting member becomes self-sealing at a definite pressure. In this way a tube or shell is formed entirely free from open joints or interstices, so that it is impossible for the external water pressure to force the superposed lead cover or sheath into gaps of the supporting member or through interstices in it on to the cable core. In order to effect an intimate contact between the adjacent wires of the supporting member already during the manufacture of the cable, the cable core may be passed between suitably arranged cooperating compression rolls after the supporting member has been applied to the core.

In the drawings affixed hereto and forming part of my specification various embodiments of my invention are illustrated in cross-sections through various constructions of my improved cable.

Referring to Fig. 1 of the drawings, it will be seen that the supporting member consists of wires of trapezoidal cross-section 1 and 2, which are twisted together or cabled into a tubular shell. Wires of higher compressive strength 1 alternate with wires of lower compressive strength 2. The lead cover 3 is applied to the shell or tube thus produced.

Figure 2:
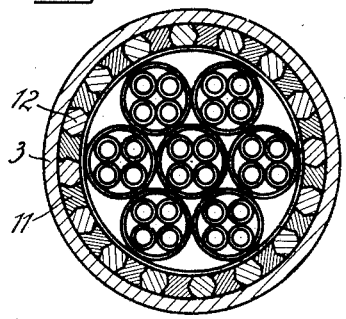

Referring to Fig. 2 of the drawings, it will be seen that the wires of higher compressive strength 11 are provided with recesses in their sides into which penetrate the wires of lower compressive strength 12.

Figure 5:
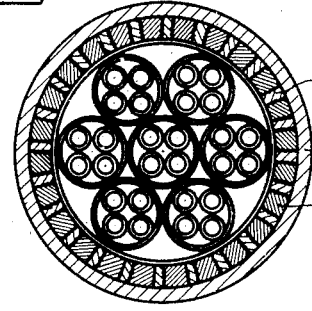

The wires of higher compressive strength may also be provided with longitudinal corrugations in their sides, as shown in Fig. 5 on the wires 41, for example. Into these corrugations flows the material of the wires of lower compressive strength 42.

Figure 3:
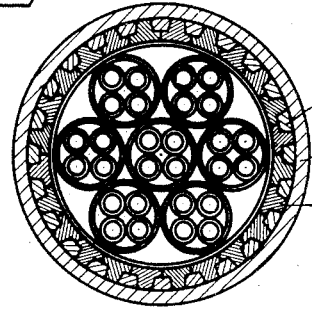
Figure 4:
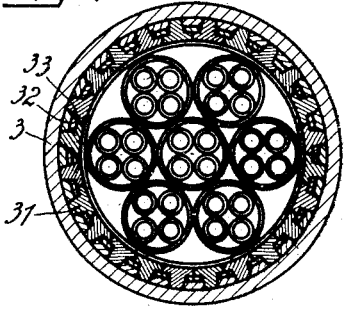
Figure 6:
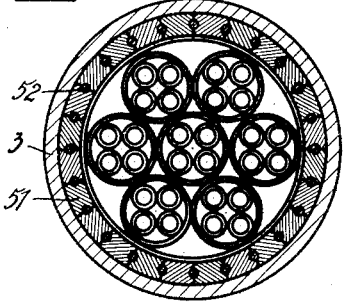

The construction may be, as illustrated in Figs. 3, 4 and 6, such that the wires of higher compressive strength directly contact with one another at the sides and that the wires of lower compressive strength are inserted into recesses formed between adjoining wires of the former kind. This design has the advantage that the diameter of the core cannot become unduly reduced by compression, if unforeseen great strains develop, for instance if the final position of the cable is at a greater depth than the previous sounding in this vicinity had indicated.

In the modifications illustrated in Figs. 3 and 4 the wires of higher compressive strength 21 or 31 respectively only make contact near the inner shell periphery, while the recesses open toward the outer periphery. Into these recesses are inserted wires of low compressive strength 22, Fig. 3. Two wires consisting of different materials may be inserted into these recesses, the wire 33, Fig. 4, nearer the core consisting preferably of a material of higher compressive strength than the outer one 32. In the design illustrated in Fig. 6 the wires of greater compressive strength contact with their inner as well as their outer portions. Into central recesses formed between these wires 51 are inserted wires of lower compressive strength 52.

In all cases a metal tape of suitable compressive strength, for instance of aluminum, zinc or the like may be wrapped around the supporting member, so that the lead cover rests upon this layer of metal tape. The inner cable core itself may also be enveloped by a special lead cover, which is then protected against external pressure by the superposed supporting member.

Various modifications and changes may be made without departing from the spirit and the scope of the invention.

I claim as my invention:

1. A lead-covered submarine cable, comprising a supporting tubular shell underneath the lead cover, said shell consisting of wires of higher compressive strength and wires of lower compressive strength, said wires of higher compressive strength contacting with one another and being provided with adjoining recesses, said wires of lower compressive strength being located in said adjoining recesses.

2. A lead-covered submarine cable, comprising a supporting tubular shell underneath the lead cover, said shell consisting of wires of higher compressive strength and wires of lower compressive strength contacting with one another at the inside facing the cable core and being provided at the outside with adjoining recesses, said wires of lower compressive strength being located in said adjoining recesses.

In testimony whereof I affix my signature.

FERDINAND HANFF.